United States Patent
Gellin et al.

(10) Patent No.: US 11,157,243 B2
(45) Date of Patent: Oct. 26, 2021

(54) CLIENT-SIDE SOURCE CODE DEPENDENCY RESOLUTION IN LANGUAGE SERVER PROTOCOL-ENABLED LANGUAGE SERVER

(71) Applicant: International Business Machines Corporation, Armonk, NY (US)

(72) Inventors: Jonathan Gellin, Chapel Hill, NC (US); Russell L. May, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 51 days.

(21) Appl. No.: 16/175,927

(22) Filed: Oct. 31, 2018

(65) Prior Publication Data

US 2020/0133639 A1    Apr. 30, 2020

(51) Int. Cl.
    *G06F 8/33*      (2018.01)
    *H04L 29/08*    (2006.01)
    *H04L 29/06*    (2006.01)

(52) U.S. Cl.
    CPC ............... *G06F 8/33* (2013.01); *H04L 67/34* (2013.01); *H04L 67/42* (2013.01)

(58) Field of Classification Search
    CPC ............ H04L 67/34; H04L 67/42; G06F 8/33
    USPC ............................................................ 709/203
    See application file for complete search history.

(56) References Cited

U.S. PATENT DOCUMENTS

| | | | |
|---|---|---|---|
| 9,361,077 B1* | 6/2016 | Hale | G06F 8/74 |
| 9,760,349 B1* | 9/2017 | Chen | G06F 8/433 |
| 2011/0283268 A1 | 11/2011 | Salter | |
| 2012/0054727 A1 | 3/2012 | Joukov et al. | |
| 2015/0100879 A1* | 4/2015 | Nandagopal | G06F 9/44521 715/235 |

(Continued)

OTHER PUBLICATIONS

Github "Language Server Protocol", https://docs.microsoft.com/en-US/visualstudio/extensibility/language-server-protocol?view=vs-2019 (Year: 2017).*

(Continued)

*Primary Examiner* — James E Springer
*Assistant Examiner* — Patrick F Ngankam
(74) *Attorney, Agent, or Firm* — Cantor Colburn LLP; Teddi Maranzano

(57) ABSTRACT

Examples of techniques for client-side source code dependency resolution in a language server protocol (LSP) enabled language server are disclosed. In one example, a method includes parsing, by the LSP-enabled language server, a source code file received from a client language editor to identify dependencies in the source code file. The method further includes, based at least in part on identifying a dependency in the source code file during the parsing, transmitting, by the LSP-enabled language server, a diagnostic message to the client language editor to request resolution of the dependency. The method further includes receiving, by the LSP-enabled language server, a dependency resolution from the client language editor. The method further includes continuing, by the LSP-enabled language server, the parsing the source code file based at least in part on the dependency resolution received from the client language editor.

20 Claims, 7 Drawing Sheets

(56) References Cited

U.S. PATENT DOCUMENTS

2018/0113686 A1    4/2018  Li et al.

OTHER PUBLICATIONS

Liu "Part 2: How Sourcegraph scales with the Language Server Protocol" https://about.sourcegraph.com/blog/part-2-how-sourcegraph-scales-with-the-language-server-protocol (Year: 2016).*
Andre et al. "Language Server Protocol" https://github.com/Microsoft/language-server-protocol/blob/master/versions/protocol-2-x.md (Year: 2018).*
Liu—"Part 2: How Sourcegraph scales with the Language Server Protocol", https://about.sourcegraph.com/blog/part-2-how-sourcegraph-scales-with-the-language-server-protocol/ (Year: 2017).*
Warren et al. "Language Server Protocol", https://github.com/microsoftDocs/visualstudio-docs/blob/master/docs/extensibility/language-server-protocol.md (Year: 2017).*

* cited by examiner

CLIENT-SIDE SOURCE CODE DEPENDENCY RESOLUTION IN LANGUAGE SERVER PROTOCOL-ENABLED LANGUAGE SERVER

BACKGROUND

The present invention generally relates to source code dependency resolution, and more specifically, to client-side source code dependency resolution in a language server protocol-enabled language server.

Language Server Protocol (LSP) is language-agnostic message-passing protocol for source code editors and associated language tooling. LSP utilizes a client-server model between source code language editors or integrated development environment (IDE) editors and an LSP-enabled language server that provides programming language-specific features. LSP facilitates mainstream IDE editor features such as syntax highlighting, syntax checking, reference management, and content assist. A benefit of LSP is that an LSP-enabled server should be able to enable language tooling features in any LSP-enabled editor.

SUMMARY

Embodiments of the present invention are directed to a computer-implemented method for client-side source code dependency resolution in a language server protocol (LSP) enabled language server. A non-limiting example of the computer-implemented method includes parsing, by the LSP-enabled language server, a source code file received from a client language editor, the parsing comprising identifying dependencies in the source code file. The method further includes, based at least in part on identifying a dependency in the source code file during the parsing, transmitting, by the LSP-enabled language server, a diagnostic message to the client language editor to request resolution of the dependency in the source code file. The method further includes receiving, by the LSP-enabled language server, a dependency resolution from the client language editor, the dependency resolution being responsive to the diagnostic message. The method further includes continuing, by the LSP-enabled language server, the parsing the source code file based at least in part on the dependency resolution received from the client language editor.

Embodiments of the present invention are directed to a system. A non-limiting example of the system includes a memory comprising computer readable instructions and a processing device for executing the computer readable instructions for performing a method for client-side source code dependency resolution in a language server protocol (LSP) enabled language server.

Embodiments of the invention are directed to a computer program product. A non-limiting example of the computer program product includes a computer readable storage medium having program instructions embodied therewith. The program instructions are executable by a processor to cause the processor to perform a method for client-side source code dependency resolution in a language server protocol (LSP) enabled language server.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
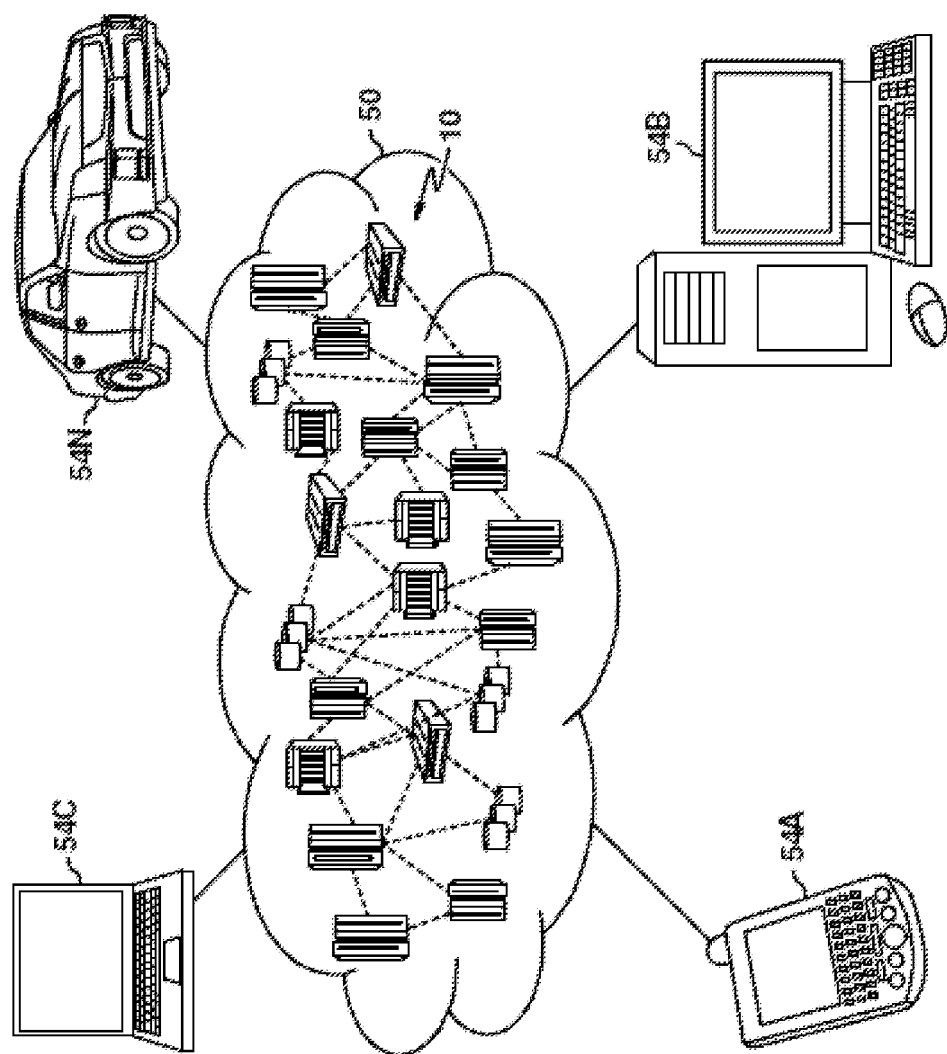
FIG. 1 depicts a cloud computing environment according to one or more embodiments described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection".

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
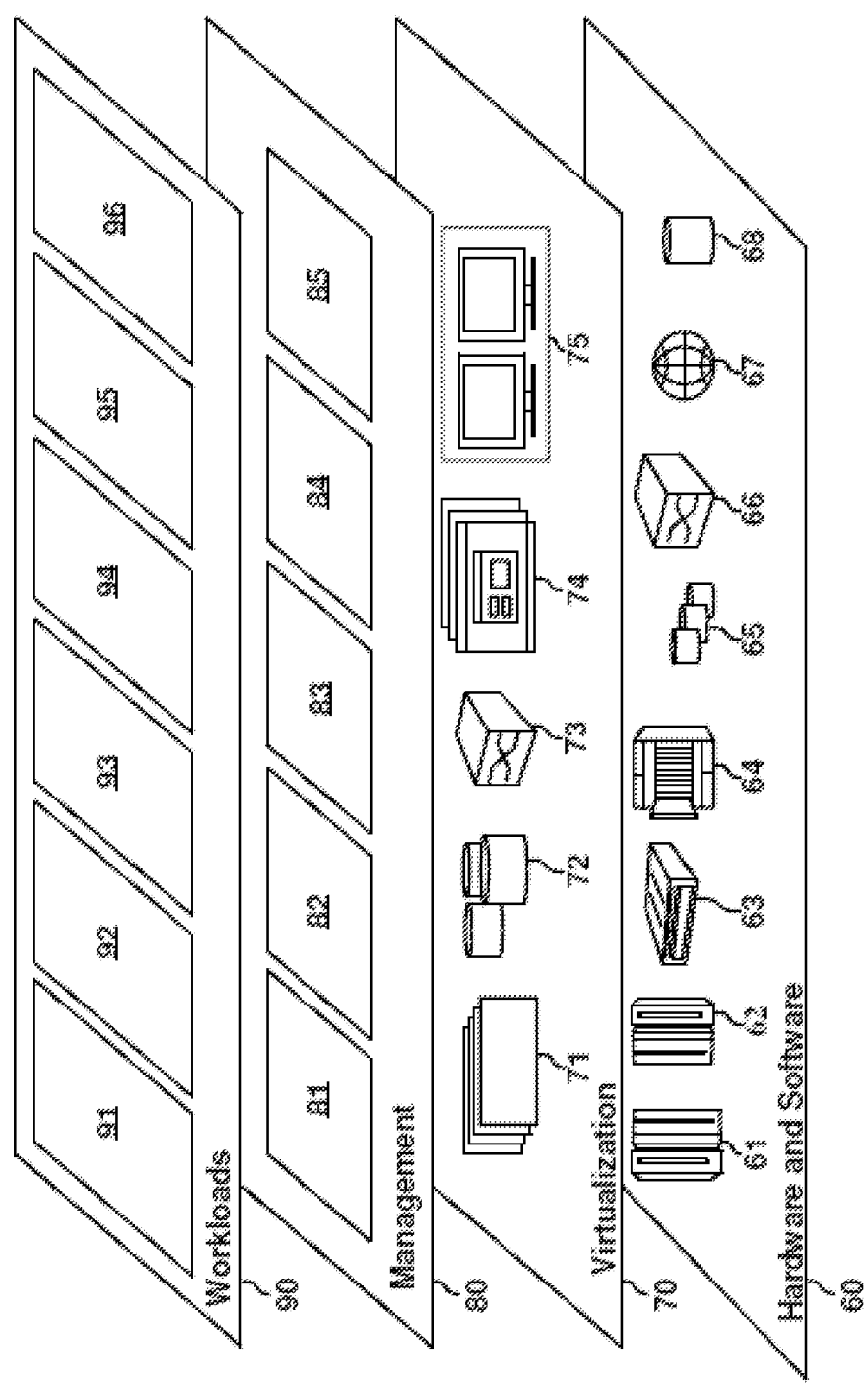
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source code dependency resolution 96.

Figure 3:
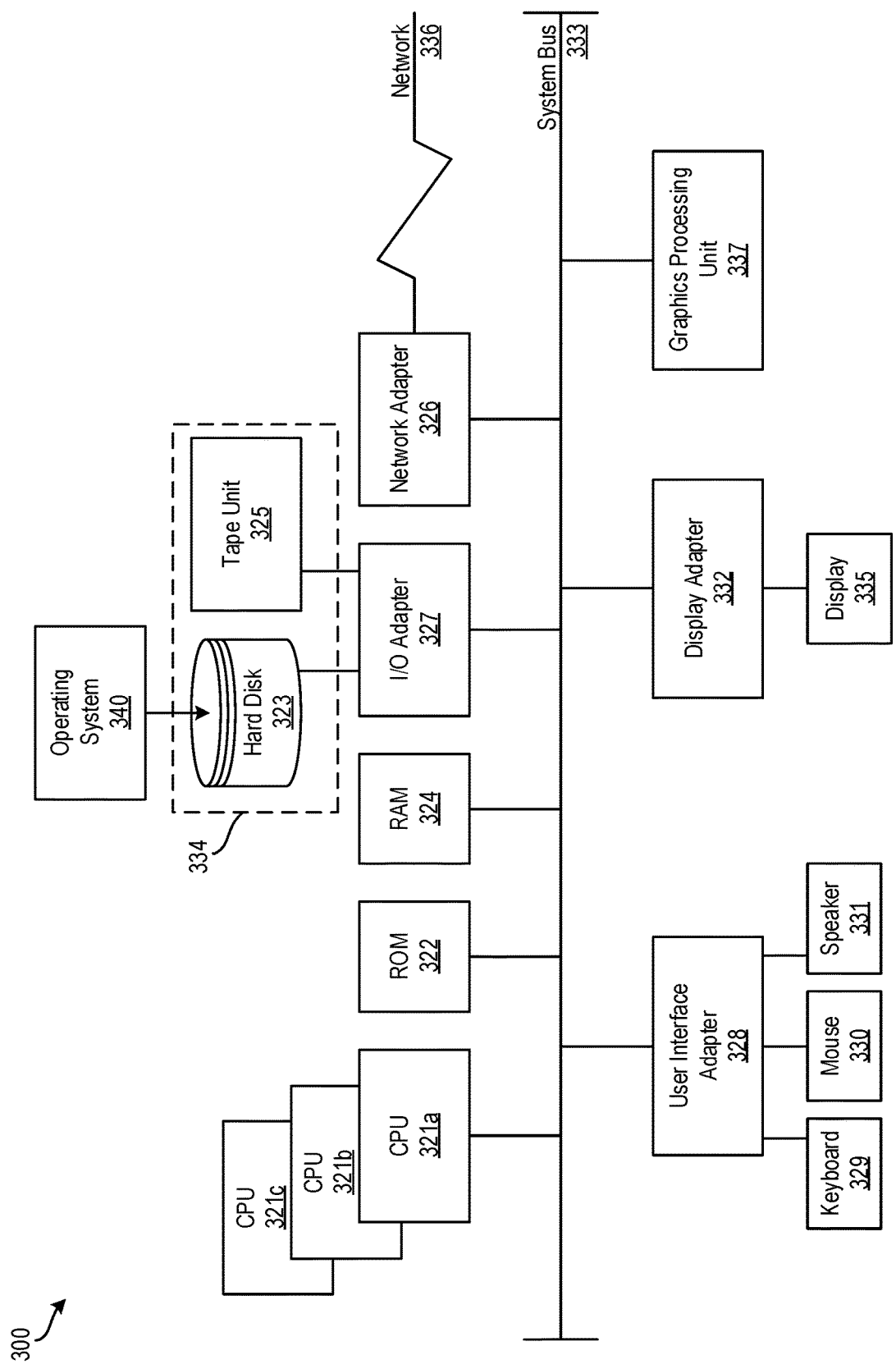
FIG. 3 depicts a block diagram of a processing system for implementing the presently described techniques according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321$a$, 321$b$, 321$c$, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to one or more embodiments of the present invention, the present techniques are directed to client-side source code dependency resolution in a language server protocol (LSP) enabled language server. Among other functions, LSP-enabled language servers provide the ability to parse source code according to the LSP protocol. Consequently, a language server needs to be able to resolve source code dependencies, such as a header file in the C language, a copy book in the COBOL language, etc. The LSP specification has built in the concept of a workspace, where it is assumed that the source code resides in a hierarchical file system (e.g., a WINDOWS-like or UNIX-like hierarchical file system), which is referred to as a workspace. In this way, it is assumed that a language server implementation can locate all necessary dependencies based on the contents of the workspace.

Figure 4:
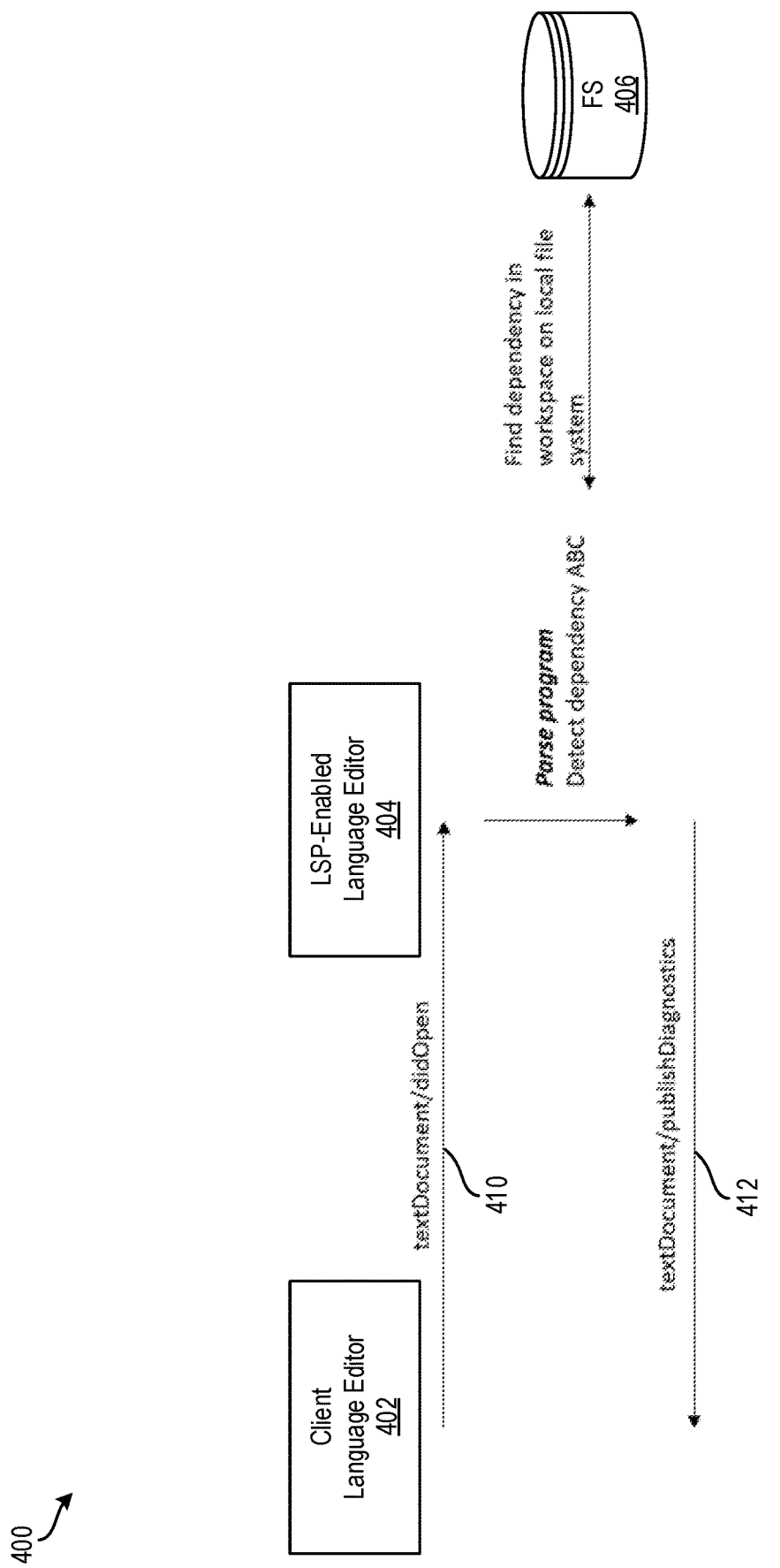
FIG. 4 depicts a sequence diagram between a client language editor and an LSP-enabled language server for performing server-side source code dependency resolution.

One example of a traditional approach to server-side source code dependency resolution is depicted in FIG. 4. In particular, FIG. 4 depicts a sequence diagram 400 between a client language editor 402 and an LSP-enabled language server 404 for performing server-side source code dependency resolution. An LSP editor session is initiated when a source code file is opened in the client language editor 402. The client language editor 402 transmits a "textDocument/didOpen" message 410 to the LSP-enabled language server 404. According to one or more embodiments described herein, this message contains a uniform resource identifier (URI) that identifies the source code file and the contents of the source code file. At this point, the LSP-enabled language server 404 asynchronously parses the source code file, and if there are syntax errors to report, the LSP-enabled language server 404 transmits a "textDocument/publishDiagnostics" message 412 back to the client language editor 402 so that the client language editor 402 can display results of the parsing. In some cases, the parsing forms the basis for much of the language tooling features supported by LSP, such as syntax errors, reference errors, content assist, dependencies, etc.

Traditional LSP-enabled language servers, such as the LSP-enabled language server 404 of FIG. 4, typically resolve dependencies using a workspace on a local file system 406 associated with the LSP-enabled language server. The local file system 406 is traditionally a hierarchical file system. However, the traditional LSP-enabled language server 404 may not be able to resolve dependencies in non-hierarchical file systems. For example, when developing on z Systems by IBM Corporation, it is common for a program to have hundreds or even thousands of dependencies, including from various file systems, such as the UNIX file system, non-hierarchical file systems used in multiple virtual storage (MVS), and non-extracted source control management (SCM) repositories. In such cases, dependencies must be located from a variety of different locations. If the dependencies were to be resolved directly by the LSP-enabled language server 404, the LSP-enabled language server 404 would have to have significant knowledge about the environment in which it is executing, such as how to access the multiple file systems and SCM repositories where dependencies may reside. However, a language server with that level of specialization for such an environment would limit its portability, thereby limiting its usefulness.

Turning now to an overview of the aspects of the invention, one or more embodiments of the invention address the above-described shortcomings of the prior art by providing an extension to traditional LSP approaches by delegating the resolution of source code dependencies to the client language editor. In particular, a new diagnostic message (i.e., a "documentRequest" message with "documentRequest/request" and documentRequest/reply" components) is introduced to request, by the language server, a dependency resolution, from the client language editor and to receive a dependency resolution at the LSP-enabled language editor from the client language editor.

The present techniques provide technical solutions that are advantageous because the language server itself does not have to manage a workspace or know much about the environment in which it is operating. The client language editor, which has knowledge of the non-hierarchical file system and dependencies, is enabled to perform dependency resolution and provide the dependency resolution back to the language server. Accordingly, the functioning of an LSP-enabled language server is improved by offloading the dependency resolution to the client language editor, thereby improving the portability and flexibility of the LSP-enabled language server and reducing processing resources used by the LSP-enabled language server because it need not determine dependencies. Moreover, the present techniques can be implemented without modifying the LSP standard.

Figure 5:
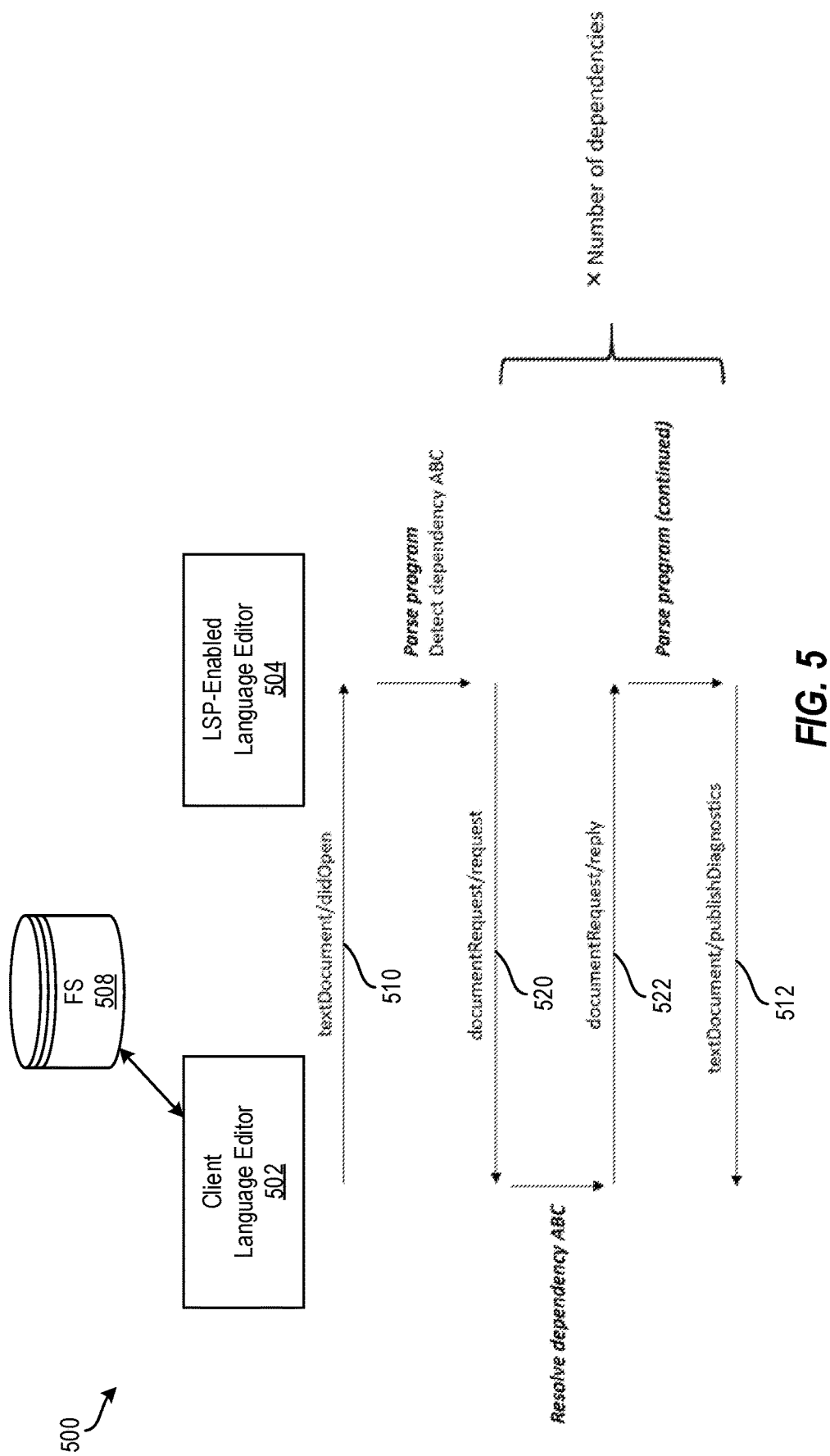
FIG. 5 depicts a sequence diagram between a client language editor and an LSP-enabled language server for performing server-side source code dependency resolution according to one or more embodiments described herein.

Turning now to a more detailed description of the technical solutions described herein, FIG. 5 depicts a sequence diagram 500 between a client language editor 502 and an LSP-enabled language server 504 for performing server-side source code dependency resolution according to one or more embodiments described herein.

An LSP editor session is initiated when a source code file is opened in the client language editor 502. The client language editor 502 transmits a "textDocument/didOpen" message 510 to the LSP-enabled language server 504. According to one or more embodiments described herein, this message contains a uniform resource identifier (URI) that identifies the source code file and the contents of the source code file. At this point, the LSP-enabled language server 504 parses the source code file, and if the LSP-enabled language server 504 identifies any dependencies in the source code, the LSP-enabled language server 504 generates a diagnostic message (e.g., the "documentRequest/request" message 520 of FIG. 5) to the client language server 504 to request that the client language editor 502 resolve the dependency.

Upon receipt of the diagnostic message, the client language editor 502 locates the dependency on a file system 508, such as a non-hierarchical file system, accessible by the client language editor 502. According to one or more embodiments described herein, the file system 508 is not known to and/or accessible by the LSP-enabled language server 504. Once the dependency is identified at the client language editor 502, the client language editor generates a message (e.g., the "documentRequest/reply" message 522 of FIG. 5) with the dependency resolution sends the dependency resolution to the LSP-enabled language server 504.

Additional dependencies can also be identified during the parsing and/or continued parsing by the LSP-enabled language server 504. The techniques described herein can be used iteratively to identify (by the LSP/enabled language server 504) dependencies and resolve (by the client language editor 502) the dependency.

Upon completion of the parsing, the LSP-enabled language server 504 transmits a "textDocument/publishDiagnostics" message 512 back to the client language editor 502 so that the client language editor 502 can display results of the parsing.

The client language editor 502 and the LSP-enabled language server 504 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the functionality of the client language editor 502 and the LSP-enabled language server 504 described herein can be implemented as a combination of hardware and programming. The programming can be processor executable instructions stored on a tangible memory, and the hardware can include a processing device (e.g., the processing device 321 of FIG. 3) for executing those instructions. Thus a system memory (e.g., the RAM 324) can store program instructions that, when executed by the processing device, implement the functionality described herein. Other engines can also be utilized to include other features and functionality described in other examples herein. The features and functionality of the client language editor 502 and the LSP-enabled language server 504 are described in more detail with reference to FIGS. 6 and 7.

Figure 6:
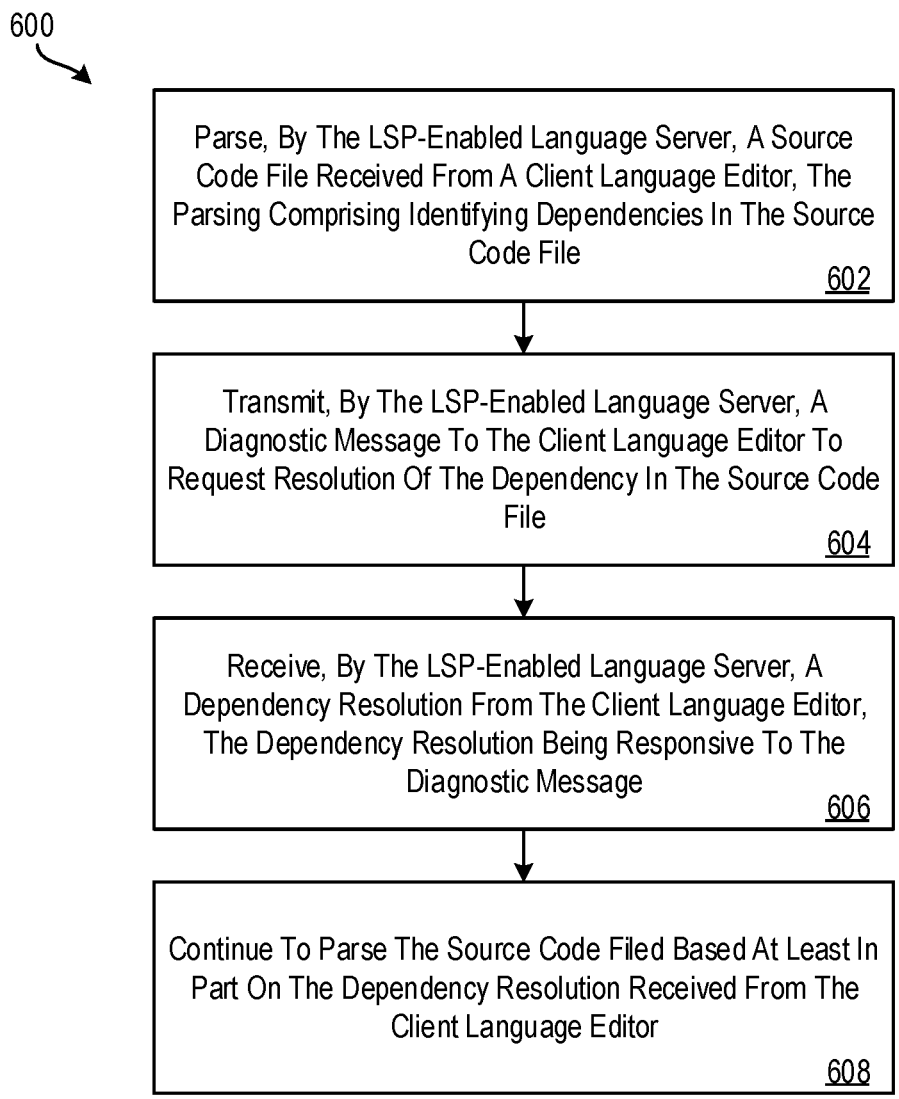
FIG. 6 depicts a flow diagram of a method for performing server-side source code dependency resolution according to one or more embodiments described herein.

In particular, FIG. 6 a flow diagram of a method 600 for performing server-side source code dependency resolution according to one or more embodiments described herein. The method 600 can be implemented using any suitable processing system (e.g., the cloud computing environment 50, the processing system 300, etc.) and/or processing device (e.g., the processing device 321). According to one or more embodiments described herein, the method 600 is implemented using the client language editor 502 and the LSP-enabled language server 504.

At block 602, the LSP-enabled language server 504 parses a source code file received from a client language editor. During the parsing, the LSP-enabled language server 504 identifies dependencies in the source code file. At block 604, the LSP-enabled language server 504 transmits a diagnostic message to the client language editor 502 to request resolution of the dependency in the source code file. The transmitting at block 604 is performed when a dependency in the source code file is identified during the parsing. At block 606, the LSP-enabled language server receives a dependency resolution from the client language editor 502. The dependency resolution is based on the diagnostic message. At block 608, the LSP-enabled language server 504 continues parsing the source code file based at least in part on the dependency resolution received, at block 606, from the client language editor 502.

Additional processes also may be included, and it should be understood that the process depicted in FIG. 6 represents an illustration, and that other processes may be added or existing processes may be removed, modified, or rearranged without departing from the scope and spirit of the present disclosure.

Figure 7:
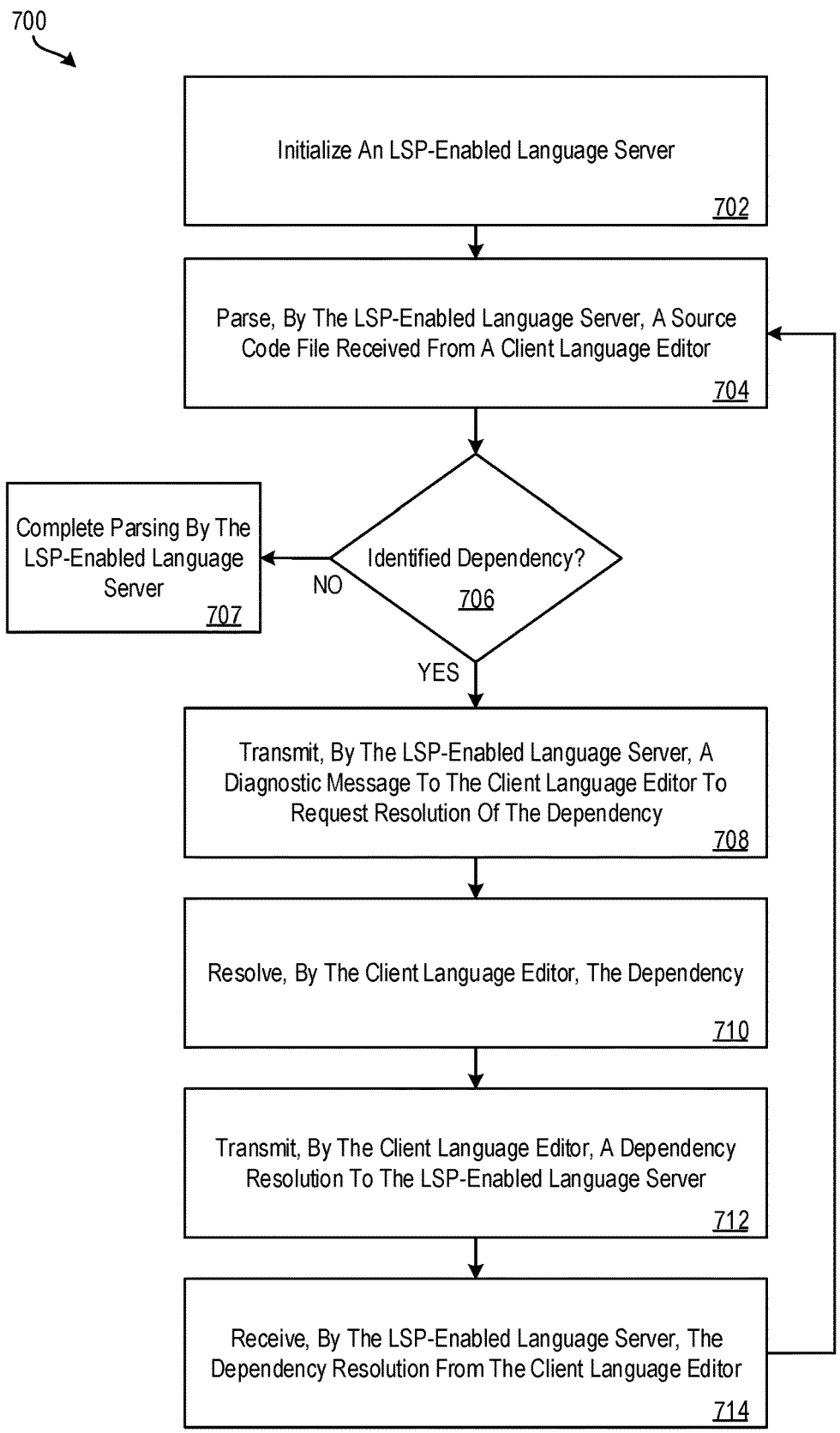
FIG. 7 depicts a flow diagram of a method for performing server-side source code dependency resolution according to one or more embodiments described herein.

FIG. 7 a flow diagram of a method 700 for performing server-side source code dependency resolution according to one or more embodiments described herein. The method 700 can be implemented using any suitable processing system (e.g., the cloud computing environment 50, the processing system 300, etc.) and/or processing device (e.g., the processing device 321). According to one or more embodiments described herein, the method 700 is implemented using the client language editor 502 and the LSP-enabled language server 504.

At block 702, the LSP-enabled language server 504 is initialized. The initialization includes the client language editor 502 and the LSP-enabled language server 504 exchanging a set of capabilities/features available to each. At block 704, the LSP-enabled language server 504 parses a source code file received from a client language editor. During the parsing, the LSP-enabled language server 504 identifies dependencies in the source code file. At decision block 706, it is determined whether a dependency is identified at block 704. If no dependency is identified, the method 700 proceeds to block 707 parsing is completed by the LSP-enabled language server 504. If, however, a dependency is identified, the method 700 continues to block 708.

At block 708, the LSP-enabled language server transmits a diagnostic message to the client language editor 502 to request resolution of the dependency in the source code file. At block 710, the client language editor 502 resolves the dependency. At block 712, the client language editor 502 transmits a dependency resolution to the LSP-enabled language server 504. At block 714, the LSP-enabled language server 504 receives the dependency resolution from the client language editor 502. Upon receipt of the dependency resolution, the LSP-enabled language server 504 continues the parsing of the source code file at block 704 using the dependency resolution.

Additional processes also may be included, and it should be understood that the process depicted in FIG. 7 represents an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for client-side source code dependency resolution in a language server protocol (LSP) enabled language server, the method comprising:

parsing, by the LSP-enabled language server, a source code file received from a client language editor, the parsing comprising identifying dependencies in the source code file;

based at least in part on identifying a dependency in the source code file during the parsing, transmitting, by the LSP-enabled language server, a diagnostic message to the client language editor to request resolution of the dependency in the source code file, the diagnostic message instructing the client language editor to locate the dependency on a file system distinct from the LSP-enabled language server;

receiving, by the LSP-enabled language server, a generated message with a dependency resolution for the dependency previously identified by the LSP-enabled language server from the client language editor, the dependency resolution being responsive to the diagnostic message, the dependency previously identified by the LSP-enabled language server being located in the file system unknown and inaccessible to the LSP-enabled language server, thereby offloading from the LSP-enabled language server processing associated with the dependency previously identified;

continuing, by the LSP-enabled language server, the parsing the source code file based at least in part on the dependency resolution received from the client language editor; and responsive to completion of the parsing, transmitting, by the LSP-enabled language server, a message to the client language editor to cause the client language editor to display results of the parsing.

2. The computer-implemented method of claim 1, further comprising, prior to the parsing, initializing the LSP-enabled language server.

3. The computer-implemented method of claim 2, wherein the initializing the LSP-enabled language server further comprises the client language editor and the LSP-enabled language server exchanging a set of capabilities available to each.

4. The computer-implemented method of claim 2, wherein the initializing the LSP-enabled language server utilizes a uniform resource identifier that identifies the source code file and contents of the source code file.

5. The computer-implemented method of claim 1, wherein the source code is stored in a non-hierarchical file system.

6. The computer-implemented method of claim 5, wherein the non-hierarchical file system is accessible by the client language editor.

7. The computer-implemented method of claim 5, wherein the non-hierarchical file system is not accessible by the LSP-enabled language server.

8. A system comprising:
a memory comprising computer readable instructions; and
a processing device for executing the computer readable instructions for performing a method for client-side source code dependency resolution in a language server protocol (LSP) enabled language server, the method comprising:
parsing, by the LSP-enabled language server, a source code file received from a client language editor, the parsing comprising identifying dependencies in the source code file;
based at least in part on identifying a dependency in the source code file during the parsing, transmitting, by the LSP-enabled language server, a diagnostic message to the client language editor to request resolution of the dependency in the source code file, the diagnostic message instructing the client language editor to locate the dependency on a file system distinct from the LSP-enabled language server;
receiving, by the LSP-enabled language server, a generated message with a dependency resolution for the dependency previously identified by the LSP-enabled language server from the client language editor, the dependency resolution being responsive to the diagnostic message, the dependency previously identified by the LSP-enabled language server being located in the file system unknown and inaccessible to the LSP-enabled language server, thereby offloading from the LSP-enabled language server processing associated with the dependency previously identified;
continuing, by the LSP-enabled language server, the parsing the source code file based at least in part on the dependency resolution received from the client language editor; and
responsive to completion of the parsing, transmitting, by the LSP-enabled language server, a message to the client language editor to cause the client language editor to display results of the parsing.

9. The system of claim 8, wherein the method further comprises, prior to the parsing, initializing the LSP-enabled language server.

10. The system of claim 9, wherein the initializing the LSP-enabled language server further comprises the client language editor and the LSP-enabled language server exchanging a set of capabilities available to each.

11. The system of claim 9, wherein the initializing the LSP-enabled language server utilizes a uniform resource identifier that identifies the source code file and contents of the source code file.

12. The system of claim 8, wherein the source code is stored in a non-hierarchical file system.

13. The system of claim 12, wherein the non-hierarchical file system is accessible by the client language editor.

14. The system of claim 12, wherein the non-hierarchical file system is not accessible by the LSP-enabled language server.

15. A computer program product comprising:
a computer readable storage medium having program instructions embodied therewith, the program instructions executable by a processing device to cause the processing device to perform a method for client-side source code dependency resolution in a language server protocol (LSP) enabled language server, the method comprising:
parsing, by the LSP-enabled language server, a source code file received from a client language editor, the parsing comprising identifying dependencies in the source code file;
based at least in part on identifying a dependency in the source code file during the parsing, transmitting, by the LSP-enabled language server, a diagnostic message to the client language editor to request resolution of the dependency in the source code file, the diagnostic message instructing the client language editor to locate the dependency on a file system distinct from the LSP-enabled language server;
receiving, by the LSP-enabled language server, a generated message with a dependency resolution for the dependency previously identified by the LSP-enabled language server from the client language editor, the dependency resolution being responsive to the diagnostic message, the dependency previously identified by the LSP-enabled language server being located in the file system unknown and inaccessible to the LSP-enabled language server, thereby offloading from the LSP-enabled language server processing associated with the dependency previously identified;
continuing, by the LSP-enabled language server, the parsing the source code file based at least in part on the dependency resolution received from the client language editor; and
responsive to completion of the parsing, transmitting, by the LSP-enabled language server, a message to the client language editor to cause the client language editor to display results of the parsing.

16. The computer program product of claim 15, wherein the method further comprises, prior to the parsing, initializing the LSP-enabled language server.

17. The computer program product of claim 16, wherein the initializing the LSP-enabled language server further comprises the client language editor and the LSP-enabled language server exchanging a set of capabilities available to each.

18. The computer program product of claim 16, wherein the initializing the LSP-enabled language server utilizes a uniform resource identifier that identifies the source code file and contents of the source code file.

19. The computer program product of claim 15, wherein the source code is stored in a non-hierarchical file system.

20. The computer program product of claim 19, wherein the non-hierarchical file system is accessible by the client language editor, and wherein the non-hierarchical file system is not accessible by the LSP-enabled language server.

* * * * *